(12) United States Patent
Liao et al.

(10) Patent No.: US 11,609,787 B2
(45) Date of Patent: Mar. 21, 2023

(54) FPGA-BASED DYNAMIC GRAPH PROCESSING METHOD

(71) Applicant: Huazhong University of Science and Technology, Hubei (CN)

(72) Inventors: Xiaofei Liao, Hubei (CN); Yicheng Chen, Hubei (CN); Yu Zhang, Hubei (CN); Hai Jin, Hubei (CN); Jin Zhao, Hubei (CN); Xiang Zhao, Hubei (CN); Beibei Si, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 384 days.

(21) Appl. No.: 16/947,055

(22) Filed: Jul. 16, 2020

(65) Prior Publication Data
US 2021/0191763 A1    Jun. 24, 2021

(51) Int. Cl.
G06F 9/48 (2006.01)
G06F 9/50 (2006.01)

(52) U.S. Cl.
CPC ............ G06F 9/4881 (2013.01); G06F 9/505 (2013.01); G06F 9/5066 (2013.01); G06F 2209/5017 (2013.01); G06F 2209/5018 (2013.01)

(58) Field of Classification Search
CPC .............. G06F 9/4881; G06F 9/5066; G06F 2209/5017; G06F 2209/5018
See application file for complete search history.

(56) References Cited

U.S. PATENT DOCUMENTS 11,436,055 B2 * 9/2022 Banerjee ............... G06F 9/5066
2014/0136555 A1 * 5/2014 Jacob .................. G06F 16/9024
707/754

OTHER PUBLICATIONS

Zhou et al. An FPGA Framework for Edge-Centric Graph Processing, [online] (May 10). ACM., pp. 69-77. Retrieved From the Internet <https://dl.acm.org/doi/pdf/10.1145/3203217.3203233> (Year: 2018).*

* cited by examiner

Primary Examiner — Emerson C Puente
Assistant Examiner — Jonathan R Labud
(74) Attorney, Agent, or Firm — Michael Ye; Rimon Law

(57) ABSTRACT

The present disclosure relates to an FPGA-based dynamic graph processing method, comprising: where graph mirrors of a dynamic graph that have successive timestamps define an increment therebetween, a pre-processing module dividing the graph mirror having the latter timestamp into at least one path unit in a manner that incremental computing for any vertex only depends on a preorder vertex of that vertex; an FPGA processing module storing at least two said path units into an on-chip memory directly linked to threads in a manner that every thread unit is able to process the path unit independently; the thread unit determining an increment value between the successive timestamps of the preorder vertex while updating a state value of the preorder vertex, and transferring the increment value to a succeeding vertex adjacent to the preorder vertex in a transfer direction determined by the path unit, so as to update the state value of the succeeding vertex.

7 Claims, 3 Drawing Sheets

FPGA-BASED DYNAMIC GRAPH PROCESSING METHOD

CROSS-REFERENCE TO RELATED APPLICATIONS

This application claims the benefit of China Patent Application No. 201911334671.0 filed on Dec. 20, 2019, which is incorporated by reference herein in its entirety.

BACKGROUND OF THE INVENTION

Technical Field

The present invention relates graph computing in the field of big data processing for computers, and more particularly to an FPGA-based dynamic graph processing method.

Description of Related Art

In the era of big data, graph processing systems become more and more important. As a kind of data structure, graphs are highly expressive in terms of structure and semantics, making them very capable of expressing relationship among objects. By abstracting relationship attributes in the real world into a graph data structure, a graph processing system can perform graph algorithms to analyze these graph data. For example, PageRank algorithm could perform importance ranking among vertices, or, with the strongly connected component algorithm, reachability relationship among vertices can be figured out.

However, since the relationship among objects in the real world is ever changing, causing the graph data structure to change frequently and dynamically, thus dynamic graph processing is attracting more and more attention. A dynamic graph is usually regarded as a sequence of a group of graph mirrors. Therein, every graph mirror corresponds to the static graph data structure of the dynamic graph at a certain checkpoint. The traditional dynamic graph processing systems are CPU-based, and mainly use following two approaches. The first dynamic graph processing method is about performing the static graph algorithm on every graph mirror for total computation. In this approach, the graph mirror having undergone every change is taken as a whole new static graph, and the entire graph is processed again. Such a process greatly occupies the main memory, and causes huge redundant data access and computing, making it difficult to provide real-time response to frequent, dynamic changes of a graph data structure in the real world. Another known approach of dynamic graph processing is about performing incremental computation on a new graph mirror based on the structure of the previous graph mirror. It involves first dynamically maintaining the result of every incremental computing, using the result to initialize the next incremental computing, and then selecting a vertex affected by the increment as a start point to propagate the effect along edges to other vertices. By utilizing the relationship between two adjacent graph mirrors of every change of the dynamic graph, the foregoing incremental computing requires less redundant data access and computing than total computing, and makes dynamic graph processing more real-time. However, whether they execute total computing or incremental computing, the traditional CPU-based dynamic graph processing systems suffer from low instruction-level parallelism and high random access latency at the bottom-layer instruction stream structure.

In order to improve the traditional CPU-based structures in terms of efficiency, FPGA-based graph processing has become a prominent area of research in graph computing. The FPGA-based approach processes a graph by uploading graph data from an off-chip memory to an on-chip memory BRAM of the FPGA, and using an on-chip programmable logic unit of the FPGA to customize a data stream model for graph processing. It makes graph data in the BRAM flow through different custom hardware modules (such as a vertex-capturing module, an edge-offset module, and so on) in the data stream model successively like a "stream," and have the outputs of the modules written back into sites in the BRAM corresponding to the graph data. When none of the flowing graph data show update (or only have update smaller than the threshold), graph iteration converges and graph processing stops, thereby outputting the final result. This FPGA-based graph processing approach makes full use of the bandwidth resources and the computing resources on the FPGA chip, so as to effectively address the low-efficiency problem of the traditional structure. However, all the existing FPGA-based graph processing approaches are oriented to static graph data. For dynamic graphs, they usually employ a total computing scheme to process every graph mirror, and this is known as FPGA-based dynamic graph total computing.

For example, China Patent Publication Number CN106033476B discloses an incremental graph computing method under a distributed computing model in a cloud computing environment. The known method comprises: merging servers to generate an increment graph; merging the servers and comparing the increment graph with a historical graph, so as to find out and merge the vertex sets of the unchanged parts of the link structure in the historical graph and distribute them to every sub-node data exchanger; before operation starts, the data exchangers of every sub-nodes performs co-gradient transformation on the historical computing data of the vertices in the unchanged parts; for each computing task, filtering the vertices in the unchanged parts and loading the relevant historical computing data; and during the computing task, in each round of super-step computing, reusing the historical computing data of the vertices in the unchanged parts and when the computing is completed saving computing data of this operation. The known method reuses the computing information corresponding to the vertices in the unchanged parts of the link structure in the graph file, thereby reducing repeated computing that causes waste on resources and enhancing performance as compared to an unimproved system.

FPGA-based total computing is insensitive to changes in dynamic graph structures, and thus has the following shortcomings when processing dynamic graphs: (1) Slow convergence during graph iteration: all of the existing FPGA-based total computing approaches use synchronous models to perform iteration computing on graph data, which means the computing result of the current iteration can only be used in the next iteration. Therefore, the increment in every round of iteration can only propagate along edges with single step length, resulting in slow propagation; (2) High memory access latency: in the event of changes in a dynamic graph, increment propagates along paths. However, the existing FPGA-based graph processing approaches store graph data by the serial numbers of vertices in a graph. The serial numbers of vertices in the same path are usually distributed randomly, and their locations in the memory are not continuous. This means poor spatial locality and temporal locality of graph data, and leads to low access bandwidth utilization and high latency during memory access; (3)

Redundant computing: during dynamic graph processing, only the graph data affected by increment need to participate in incremental computing. However, in the existing FPGA-based dynamic graph total computing approaches, a huge number of graph data not affected by increment still participates in computing, thus causing redundant computing.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

In view of the shortcomings of the prior art, the present invention discloses an FPGA-based dynamic graph processing method, comprising: a pre-processing step: where graph mirrors of a dynamic graph that have successive timestamps define an increment therebetween, a pre-processing module dividing the graph mirror having the latter timestamp into at least one path unit in a manner that incremental computing for any vertex only depends on a preorder vertex of that vertex; a storing step: where there are two or more said path units, an FPGA processing module storing at least two said path units into an on-chip memory directly linked to threads in a manner that every thread unit is able to process the path unit independently; and an incremental computing step: the thread unit determining an increment value between the successive timestamps of the preorder vertex while updating a state value of the preorder vertex, and transferring the increment value to a succeeding vertex adjacent to the preorder vertex in a transfer direction determined by the path unit, so as to update the state value of the succeeding vertex, writing the updated vertex state value back into the on-chip memory, until all said vertices of the path unit have been updated, and when all the thread units have updated the vertices of the path units, a merging-computing-driving module merging and calculating node graph data, and then uploading the data to a main graph-processing module, so as to complete graph processing.

According to a preferred mode, the pre-processing step at least comprises pre-processing sub-steps of: performing traversal on the graph mirror of the dynamic graph having the latter timestamp, and accessing every vertex of the graph mirror during the traversal, in which a sub-edge is formed between adjacent two vertices; based on a preset path length, dividing the path into said path units in a manner that any two said path units do not have any common sub-edges existing therebetween; and performing an increment analysis on the path units, marking a said path unit that has an increment as an active path unit and sending it to the on-chip memory, and marking a said path unit that does not have an increment as a to-be-activated path unit and sending it to the merging-computing-driving module, where it waits to be activated by the thread unit, so as to complete incremental computing.

According to a preferred mode, for the pre-processing step: the preset path length includes a first path length threshold and a second path length threshold, and the path unit has a length that is between the first path length threshold and the second path length threshold, so that the thread units are able to perform parallel updating on the path units when a load imbalance rate is lower than a load imbalance threshold.

According to a preferred mode, the pre-processing step further comprises: the pre-processing module being able to select at least one common node as a start point for the traversal, and record a traversal path while marking nodes that have increment; according to a graph structure of the graph processing, defining the path units within the preset path length taking the nodes that have increment as breakpoints, and marking them as the active path units; and storing the graph mirrors outside the path units into the main graph-computing module by means of creating mirror data of the breakpoints, so as to wait for the path units that need to receive increment updating, thereby completing the graph processing.

According to a preferred mode, the incremental computing step at least comprises computing sub-steps of: the thread unit reading the path units and the increment on the on-chip memory it directly links to in a synchronous, time-sequence manner; based on the increment, according to the graph structure, performing increment updating on the state values of the vertices one by one, and saving the state value of each said vertex to the on-chip memory as soon as it is updated, until the state value of the last vertex is updated; and the merging-computing-driving module, according to the graph structure, uploading the state values of the last vertices of the path units to the main graph-processing module one by one through the on-chip memory and/or through the thread units.

According to a preferred mode, the pre-processing module generates the path units and feed them back as a work queue to the merging-computing-driving module, and only when the merging-computing-driving module determines that the thread unit has completed the incremental computing for the active path units and the activated path units based on the work queue, sends the increment result generated by the thread unit to the main graph-processing module.

According to a preferred mode, if the inactive path units and the active path units share common vertices, the pre-processing module creates the mirror data of the common vertices, so that the main graph-processing module is able to establish incremental relationship with the mirror data based on the state values of the common vertices in the active path units during the graph processing.

According to a preferred mode, the pre-processing module is able to read updated vertex data and/or edge data of the path units from the on-chip memory, so that the pre-processing module is able to use the updated vertex data and/or edge data as reference data when determining graph data increment of the adjacent succeeding timestamp.

According to a preferred mode, the present invention discloses a system for executing the processing method.

The present invention provides an FPGA-based dynamic graph computing method and system, which have the flowing beneficial effects as compared to the prior art:

(1) Accelerating increment propagation: the present invention limits incremental computing inside paths. When incremental computing is performed in one path, by means of asynchronous iteration, the increment value of preorder vertices can fast propagate forward through the entire trailing path in the same round of iteration, thereby speeding up increment propagation;

(2) Reducing memory access latency: according to the present invention, plural paths are uploaded to the on-chip memory each time, and every path takes an exclusive space in the on-chip memory. When every custom pipeline processes the corresponding path, the on-chip memory is accessed according to the order of the vertices in the path, so as to make full use of the high random access bandwidth of an FPGA on-chip memory, thereby reducing memory access latency; and (3) Reducing redundant computing: through processing the paths affected by increment first, the present invention limits the working scope of incremental computing, thereby saving the hardware pipeline from redundant data access and computing for those paths not affected by increment during incremental computing and in turn reducing redundant computing.

DETAILED DESCRIPTION OF THE INVENTION

The following description is to be read with reference to FIG. 1 through FIG. 4.

For clarity, some technical terms used in this document are defined as below:

FPGA: Field Programmable Gate Array.

CPU: Central Processing Unit.

Graph computing: a process using a graph as a data model to express and solve questions.

Graph: an abstract data structure that represents relationship among objects and makes description with vertices and edges, wherein a vertex denotes an object and an edge denotes relationship between two objects.

Graph data: data that can be abstracted into a graph for description.

Embodiment 1

Figure 1:
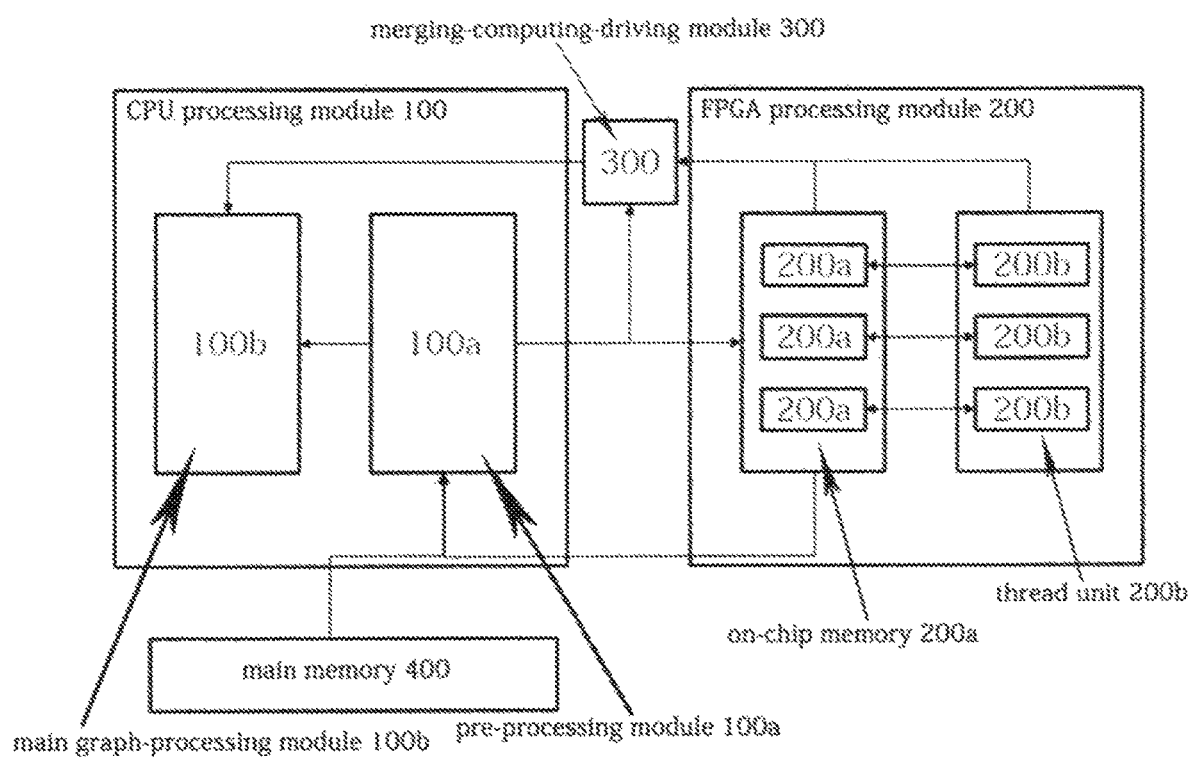
FIG. 1 is a schematic modular diagram of an FPGA-based dynamic graph computing system according to the present invention.

The present embodiment discloses an FPGA-based dynamic graph processing system. As shown in FIG. 1, the system at least comprises a pre-processing module 100a and an FPGA processing module 200. The pre-processing module 100a divides a graph mirror into at least one path unit. Before dividing the graph mirror into the path unit(s), the pre-processing module 100a determines whether there is increment between graph mirrors of successive timestamps. If the graph mirrors of successive timestamps do have increment therebetween, the pre-processing module 100a divides the graph mirror having the latter timestamp into at least one path unit. Preferably, in the path unit, incremental computing for any vertex only depends on a preorder vertex of that vertex.

Figure 3:
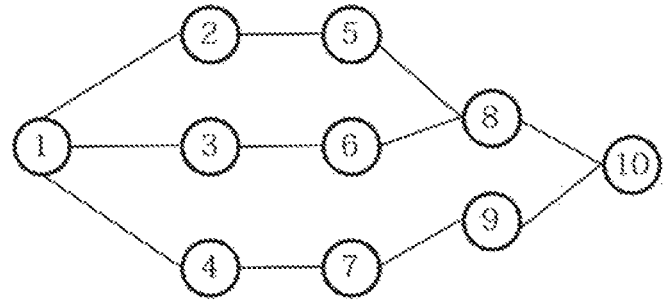
FIG. 3 shows a graph data structure to be processed according to the present invention.
Figure 4:
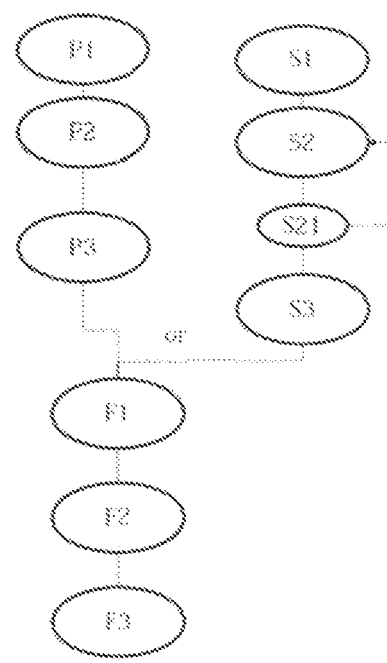
FIG. 4 is a flowchart of an FPGA-based dynamic graph computing method according to the present invention.

Preferably, the pre-processing module 100a is configured to perform the following sub-steps to divide the graph mirror:

S1: performing traversal on the graph mirror of the dynamic graph corresponding to the latter timestamp; accessing every said vertex of the graph mirror during the traversal; a sub-edge is formed between adjacent two said vertices. For example, FIG. 3 shows a graph structure of a graph mirror. The graph structure comprises 10 vertices. The traversal may be begun from Vertex 1 and move to Vertex 10 according to the graph structure. As shown in FIG. 3, one of the sub-edges may be 1→2. The path may be 1→2→5. Of course, it may be 1→2, or a single vertex.

S2: based on a preset path length, dividing the path into said path units in a manner that there is not any common sub-edge existing between any two said path units. The preset path length may be, for example, of 0 unit (a single vertex), 1 unit (two vertices) or so on. For instance, the path unit 1→2→5→8→10 and the path unit 1→3→6→8→10 have the same sub-edge 8→10, and the path division is so made that no common sub-edges exist between any two path units. Thus, in this case, the graph should divided as 1→2→5→8, 1→3→6→8 and 8→10.

S3: performing an increment analysis on the path units. The increment may be about changes in the vertex data, such as a change in the data of Vertex 1. Alternatively, the increment may be about structural changes of the vertex objects. For example, a path unit in the previous timestamp is 1→2→5→8 and becomes 1→2→8 in the next timestamp. Further alternatively, the increment may be about changes in the sub-edge data of the vertex objects, For example, with respect to a path unit 1→2, the sub-edge data corresponding to the previous timestamp is A, and for the next timestamp is B. If a path unit shows increment, the path unit is marked as an active path unit and sent to the on-chip memory 200a. Alternatively, if no increment is shown, the path unit is marked as a to-be-activated one and sent to the merging-computing-driving module, where it waits to be activated by the thread unit, so as to complete incremental computing.

Preferably, the pre-processing sub-step S2 further comprises the following steps.

S21: the preset path length comprising a first path length threshold and a second path length threshold. The thread unit 200b is a processing unit that performs parallel acceleration on path units, and load should be balanced to improve consistence of parallel processing. However, graphs have complex structures, some paths are single-link paths, e.g., the path 1→4→7→9→10 in FIG. 3, and some paths are bifurcate-link paths, e.g., the path unit 1→2→5→8→10 and the path unit 1→3→6→8→10 share the same sub-edge 8→10. For ensuring computing accuracy for such a bifurcate-link structure, it is necessary to further divide it into 1→2→5→8, 1→3→6→8 and 8→10. This causes differences in length among the path units and also in processing time required by the thread units 200b, thereby making the main graph-processing module 100b of the graph computing wait too long. To address this, the length of each path unit shall be set between the first path length threshold and the second path length threshold, so that the thread unit 200b can perform parallel update on the path units while the load imbalance ratio keeps lower than the load imbalance threshold. If the length of the path unit is not between the first path length threshold and the second path length threshold, link addition or link breakage should be performed. Herein, link addition means adding inactive path units into an active path unit, and link breakage means breaking an active path unit into at least two segments.

Preferably, after dividing graph mirrors into active path units and inactive path units, the pre-processing module 100a creates mirror data of the shared node. For example, the active paths are 1→2→5→8 and 1→3→6→8, while the inactive path is 8→10. Therefore, the pre-processing module 100a creates mirror data of the shared node 8, so that the graph structure can be rebuilt in the merging-computing-driving module 300 based on the mirror data. The merging-computing-driving module 300 is able to establish incremental relationship with the mirror data of the shared node based on the state values of the shared vertices in the active path units during the graph computing.

Preferably, the pre-processing module 100a is a part of the CPU processing module 100. Where there are two or more path units (due to its nature of complication, a dynamic graph always has hundreds or thousands of path units in nature), the FPGA processing module 200 includes hundreds or thousands of thread units 200b, and each thread unit 200b may be directly linked to an on-chip memory 200a. The FPGA processing module 200 thus can store the at least two path units into the on-chip memories 200a directly linked with the corresponding thread in a manner that every said thread unit is able to process the path unit independently.

Figure 2:
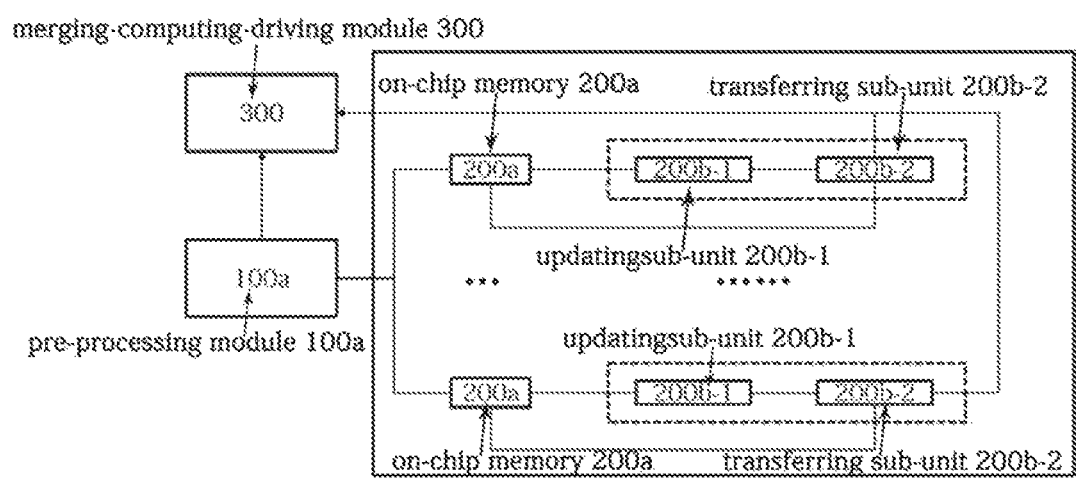
FIG. 2 is a schematic diagram of incremental computing module of the preferred dynamic graph computing system of the present invention.

Preferably, the thread unit 200b determines an increment value between the successive timestamps of the preorder vertex while updating a state value of the preorder vertex. As shown in FIG. 2, for the path unit 1→2→5→8, the updating sub-unit 200b-1 updates the state value of the preorder vertex 1 so the preorder vertex 1 has an increment value. Then the transferring sub-unit 200b-2 transfers the increment value to the following vertex 2. The increment value is transferred to the node 8 according to the logic structure determined by the graph structure, until the state value of the vertex 8 is updated. When all of the thread units 200b have updated the vertices of the path unit, the merging-computing-driving module 300 merge and calculates node graph data and loads them onto a main graph-processing module 100b, so as to complete graph computing.

Preferably, the thread unit 200b performs incremental computing through the following incremental computing sub-steps:
F1: the thread unit 200b reads the path units and the increment on the on-chip memory 200a it directly links to by means of a scheduled, synchronous processing process. Since the load is balanced to the greatest possibility in the pre-processing module 100a, the processing time of the thread unit 200b can basically be synchronous;
F2: based on the increment, according to the graph structure, performing increment updating on the state values of the vertices; wherein the state value of each vertex is stored into the on-chip memory 200a as soon as it is updated, until the state value of the last vertex is updated. For example, after the state value of Vertex 1 is updated, it is immediately stored into the memory 200a;
F3: the merging-computing-driving module 300, according to the graph structure, uploads the state values of the last vertices of the path units to the main graph-processing module 100b one by one through the on-chip memory 200a and/or through the thread units 200b. For example, the state value of the last vertex can be acquired in the on-chip memory 200a, and can be transferred by the thread unit 200b. For example, incremental computing for 1→2→5→8 and 1→3→6→8 is completed at the vertex 8, so the merging-computing-driving module 300 reads the state values of the vertex 8 of the two paths after the incremental computing from the on-chip memory 200a, and performs union operation thereon before sending the operational result to the main graph-processing module 100b, for graph computing with the inactive path 8→10.

Preferably, the pre-processing module 100 arranges all the active path units to generate a work queue. For example, a work queue of the active path units 1→2→5→8, 1→3→6→8, and 1→3→6→8→10 is generated and fed back to the merging-computing-driving module 300. The merging-computing-driving module 300 only sends the result of its increment computing to the main graph-processing module 100b after receiving the three active paths, so as to ensure the data accuracy of graph computing. Preferably, the main graph-processing module 100b is another computing part of the CPU processing module.

Preferably, the pre-processing module 100a can read the updated vertex data and/or edge data of the path units of the on-chip memory 200a, so that the pre-processing module 100 can use the updated vertex data and/or edge data as reference data when determining graph data increment for the next timestamp. Assuming that at Timestamp $t_0$ data relationship of 1→2→5→8 is: A→B→C→D, and at Timestamp $t_1$ it is: A+Δa→B(+Δa)→C(+Δa)→D(+Δa), so at Timestamp $t_2$ it is E→F→G→H, then the pre-processing module 100a will calculate the increment for Timestamp $t_2$ using the graph data of Timestamp $t_1$.

Embodiment 2

It is to be noted that the embodiment described in detail below is merely intended to illustrate but not limit the present invention. Besides, all the technical features in the embodiments described herein may be combined as long as no conflict or contradiction is caused.

Preferably, the pre-processing module 100a may perform division through the following pre-processing sub-steps:
P1: the pre-processing module 100a is able to select at least one common node as a start point for the traversal, and record a traversal path while marking nodes that show the increment. For example, the common nodes may be 1, 8 and 10. When the current traversal has traversed one common node and reaches another common node, the current traversal ends. The way thus has the following advantages. First, parallel traversal, by which the pre-processing time required by the pre-processing module 100a can be saved. Second, faster path recognition, since common nodes usually have common sub-edges so the pre-processing module 100a can finish division of path units faster. Third, increment nodes are marked during traversal, and then the increment nodes and the common nodes are divided into path units, so as to accomplish marking and dividing the graph mirrors during traversal, thereby facilitating positional division of the path units;
P2: according to a graph structure of the graph computing, using the nodes showing the increment as breakpoints to divide the path units not exceeding the preset path length, and marking them as the active path units. The preset path length is also for ensuring load balance among the thread units 200b; and
P3: saving the graph mirrors outside the path units into the main graph-processing module 100b by means of creating mirror data of the breakpoints, so as to wait for the path units that receive increment updating, thereby completing the graph computing.

Embodiment 3

The invention as well as a preferred mode of use, further objectives and advantages thereof will be best understood by reference to the following detailed description of illustrative embodiments when read in conjunction with the accompanying drawings. The disclosed FPGA-based dynamic graph processing method comprises a pre-processing step and incremental computing step with the following details:

(1) The pre-processing module 100 serves to acquire path set in the latest graph mirror according to the increment existing between adjacent two graph mirrors of a dynamic graph by performing the following sub-steps:

(1.1) if the dynamic graph is processed for the first time, dividing the graph mirrors into sets of paths using the graph division method and storing them in the memory, or otherwise, proceeding with Step (1.2);

(1.2) uploading every edge in the increment to the on-chip memory, and determining the path location in the old graph mirror where the increment exists according to the location of the two vertices of the edge;

(1.3) updating all edge information stored in the paths affected by increment so as to acquire the path set in the latest graph mirror; if the length difference between different paths is lower than the threshold, re-dividing the graph mirror so as to acquire the path set;

(1.4) initializing a work queue using information of all paths affected by the increment and using it in incremental computing. The pre-processing part may be designed based on various graph dividing methods, as long as paths can be generated. For example, according to the DFS graph dividing method, an arbitrary vertex in a graph mirror of a dynamic graph is used as the start point for depth-first-search traversal, and the accessed edges are stored in order, until the number of edges reaches the preset path length threshold. In this way, all the edges in the dynamic graph are accessed once, and the path units do not share any common sub-edge, meeting the requirement of the disclosed design.

(2) The thread unit 200b is configured to process the affected paths in the work queue using the hardware pipeline until the work queue becomes empty, and to output the final result. This comprises the following sub-steps:

(2.1) uploading plural paths to the on-chip memory according to the work queue;

(2.2) distributing each path to a different custom hardware pipeline, with every pipeline accessing an independent space on the on-chip memory; and (2.3) every pipeline including a vertex updating module and an increment transferring module, so that the graph vertices in the path flow through these two modules successively; First, a hardware operator updates the state value of every vertex, and writes it back to the designated on-chip memory space. Then the increment of the vertices is transferred to the next vertex in the path;

The hardware operator in Step (2.3) is an algorithm corresponding to actual needs (such as the SCC algorithm and the PageRank algorithm), which is customized through a programmable logic unit of the FPGA and has the graph-vertex state values updated with the increment value.

(2.4) after the graph-vertex state values in plural paths have been updated, synchronizing the graph-vertex state values through the on-chip memory and the FIFO queue, and then adding the paths in which the graph-vertex state values change after the synchronization is completed to the work queue; and (2.5) checking whether the work queue is empty, and if yes, outputting the current graph data as the operational result of the accelerator, or, otherwise, returning to Step (2.1).

Embodiment 4

It is to be noted that the embodiment described in detail below is merely intended to illustrate but not limit the present invention. Besides, all the technical features in the embodiments described herein may be combined as long as no conflict or contradiction is caused.

The present embodiment discloses an FPGA-based dynamic graph processing method, which comprises:

Pre-processing step: where graph mirrors of a dynamic graph that have successive timestamps define an increment therebetween, a pre-processing module 100a dividing the graph mirror having the latter timestamp into at least one path unit in a manner that incremental computing for any vertex only depends on a preorder vertex of that vertex;

Storing step: where there are two or more said path units, an FPGA processing module 200 storing at least two path units into the on-chip memories 200a directly linked to the threads in a manner that every said thread unit is able to process the path unit independently;

Increment step: the thread unit 200b determining an increment value between the successive timestamps of the preorder vertex while updating a state value of the preorder vertex, and transferring the increment value to an adjacent succeeding vertex with respect to the preorder vertex in a transfer direction determined by the path unit, so as to update the state value of the succeeding vertex, writing the updated graph-vertex state value into the on-chip memory 200a, until all said vertices of the path unit have been updated; and Return step: when all the thread units 200b have updated the vertices of the path units, a merging-computing-driving module 300 merging and calculating node graph data before uploading the data to a main graph computing main memory 400, so as to complete graph computing.

Preferably, the pre-processing module 100a performs traversal on the graph mirror of the dynamic graph corresponding to the next timestamp, and accesses every said vertex of the graph mirror during the traversal, in which a sub-edge is formed between adjacent two said vertices. Based on a preset path length, the paths are divided into path units so that any two of the path units do not intersect.

The increment analysis is performed on the path units. If there is increment, the path unit is marked as an active path unit and sent to the on-chip memory 200a. If there is not increment, the path unit is marked as an inactive path unit and sent to the main graph-processing module 100b, so as to wait for the path units that receive increment updating, thereby completing graph computing.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An FPGA-based dynamic graph processing method, comprising the steps of:
pre-processing a dynamic graph, where graph mirrors of the dynamic graph that have successive timestamps define an increment therebetween, and a pre-processing module divides a graph mirror of said graph mirrors of the dynamic graph, said graph mirror having a latter timestamp of said successive timestamps into at least one path unit, wherein the dividing occurs in a manner that incremental computing for any vertex only depends on a preorder vertex of that vertex;

where there are two or more path units, storing via an FPGA processing module the at least two path units into an on-chip memory directly linked to threads in a manner that every thread unit is able to process the path unit independently; and an incremental computing, wherein the thread unit determines an increment value between the successive timestamps of the preorder vertex while updating a state value of the preorder vertex, and transferring the increment value to a succeeding vertex adjacent to the preorder vertex in a transfer direction determined by the path unit, so as to update the state value of the succeeding vertex, writing the updated vertex state value back into the on-chip memory, until all said vertices of the path unit have been updated, and when all the thread units have updated the vertices of the path units, a merging-computing-driving module merging and calculating node graph data, and then uploading the data to a main graph-processing module, so as to complete graph processing;

wherein the step of pre-processing further comprises:

performing traversal on the graph mirror of the dynamic graph having the latter timestamp, and accessing every vertex of the graph mirror during the traversal, in which a sub-edge is formed between adjacent two vertices;

based on a preset path length, dividing the path into said path units in a manner that any two said path units do not have any common sub-edges existing therebetween; and performing an increment analysis on the path units, marking a said path unit that has an increment as an active path unit and sending it to the on-chip memory, and marking a said path unit that does not have an increment as a to-be-activated path unit and sending it to the merging-computing-driving module, where it waits to be activated by the thread unit, so as to complete incremental computing; and wherein the pre-processing module is able to read updated vertex data and/or edge data of the path units from the on-chip memory, so that the pre-processing module is able to use the updated vertex data and/or edge data as reference data when determining graph data increment of the adjacent succeeding timestamp.

2. The processing method of claim 1, wherein for the pre-processing step:

the preset path length includes a first path length threshold and a second path length threshold, and the path unit has a length that is between the first path length threshold and the second path length threshold, so that the thread units are able to perform parallel updating on the path units when a load imbalance rate is lower than a load imbalance threshold.

3. The processing method of claim 2, wherein the pre-processing step further comprises:

the pre-processing module being able to select at least one common node as a start point for the traversal, and record a traversal path while marking nodes that have increment;

according to a graph structure of the graph processing, defining the path units within the preset path length taking the nodes that have increment as breakpoints, and marking them as the active path units; and storing the graph mirrors outside the path units into the main graph-processing module by means of creating mirror data of the breakpoints, so as to wait for the path units that need to receive increment updating, thereby completing the graph processing.

4. The processing method of claim 3, wherein the incremental computing step at least comprises computing substeps of:

the thread unit reading the path units and the increment on the on-chip memory it directly links to in a synchronous, time-sequence manner;

based on the increment, according to the graph structure, performing increment updating on the state values of the vertices one by one, and saving the state value of each said vertex to the on-chip memory as soon as it is updated, until the state value of the last vertex is updated; and the merging-computing-driving module, according to the graph structure, uploading the state values of the last vertices of the path units to the main graph-processing module one by one through the on-chip memory and/or through the thread units.

5. The processing method of claim 4, wherein the pre-processing module generates the path units and feed them back as a work queue to the merging-computing-driving module, and only when the merging-computing-driving module determines that the thread unit has completed the incremental computing for the active path units and the activated path units based on the work queue, sends the increment result generated by the thread unit to the main graph-processing module.

6. The processing method of claim 5, wherein if the inactive path units and the active path units share common vertices, the pre-processing module creates the mirror data of the common vertices, so that the main graph-processing module is able to establish incremental relationship with the mirror data based on the state values of the common vertices in the active path units during the graph processing.

7. An FPGA-based dynamic graph processing system, comprising a pre-processing module and an FPGA processing module, characterized in that, where graph mirrors of a dynamic graph that have successive timestamps define an increment therebetween, a pre-processing module configured to divide a graph mirror of said graph mirrors of the dynamic graph, said graph mirror having a latter timestamp of said successive timestamps in a manner that incremental computing for any vertex only depends on a preorder vertex of that vertex;

the pre-processing module further configured to:

perform traversal on the graph mirror of the dynamic graph having the latter timestamp, and accessing every vertex of the graph mirror during the traversal, in which a sub-edge is formed between adjacent two vertices;

based on a preset path length, divide the path into said path units in a manner that any two said path units do not have any common sub-edges existing therebetween; and perform an increment analysis on the path units, marking a said path unit that has an increment as an active path unit and sending it to the on-chip memory, and marking a said path unit that does not have an increment as a to-be-activated path unit and sending it to the merging-computing-driving module, where it waits to be activated by the thread unit, so as to complete incremental computing; and wherein the pre-processing module is able to read updated vertex data and/or edge data of the path units from the on-chip memory, so that the pre-processing module is able to use the updated vertex data and/or edge data as reference data when determining graph data increment of the adjacent succeeding timestamp;

where there are two or more said path units, the FPGA processing module configured to store at least two said path units into an on-chip memory directly linked to threads in a manner that every thread unit is able to process the path unit independently;

the thread unit determining an increment value between the successive timestamps of the preorder vertex while updating a state value of the preorder vertex, and transferring the increment value to a succeeding vertex adjacent to the preorder vertex in a transfer direction determined by the path unit, so as to update the state value of the succeeding vertex, writing the updated vertex state value back into the on-chip memory, until all said vertices of the path unit have been updated, and when all the thread units have updated the vertices of the path units;

a merging-computing-driving module configured to merge and calculate node graph data, and then uploading the data to a main graph computing thread, so as to complete graph processing.

* * * * *